United States Patent [19]

Ramstrom et al.

[11] 3,999,110
[45] Dec. 21, 1976

[54] BATTERY PACK AND LATCH

[75] Inventors: Lee Webber Ramstrom, Kingsville; Alvydas Petras Karasa, Belair; Stanley Alan Markle, Lutherville, all of Md.

[73] Assignee: The Black and Decker Manufacturing Company, Towson, Md.

[22] Filed: Feb. 6, 1975

[21] Appl. No.: 547,646

[52] U.S. Cl. .................................. 320/2; 292/254; 292/341.15; 310/50; 429/96; 429/163
[51] Int. Cl.[2] .................. H02J 7/00; E05C 13/00; E05B 15/02
[58] Field of Search ............ 292/254, 341.15; 339/91 R, 119 R, 66 R, 66 M, 136 M; 310/50; 320/2–5; 136/166

[56] References Cited
UNITED STATES PATENTS

| | | | |
|---|---|---|---|
| 3,192,378 | 6/1965 | Oldenburger | 320/2 X |
| 3,321,650 | 5/1967 | Pedone, Jr. et al. | 310/50 X |
| 3,518,524 | 6/1970 | Roszyk | 320/2 |
| 3,728,664 | 4/1973 | Hurst | 339/91 R |
| 3,734,207 | 5/1973 | Fishbein | 310/50 X |
| 3,757,194 | 9/1973 | Weber et al. | 320/2 |
| 3,883,789 | 5/1975 | Achenbach et al. | 320/2 |

*Primary Examiner*—Robert J. Hickey
*Attorney, Agent, or Firm*—William Kovensky; Edward D. Murphy; Walter Ottesen

[57] ABSTRACT

Securing means particularly for slide-in type battery pack to be used in cordless electric power tools. An L-shaped latch is pivoted on the tool, and its short leg cooperates with a release mechanism at the remote end of the battery pack. A release member, spring loaded on the battery pack, urges the latch away from the pack during disengagement. A thermostated subassembly of the cells within the battery pack is also disclosed.

33 Claims, 12 Drawing Figures

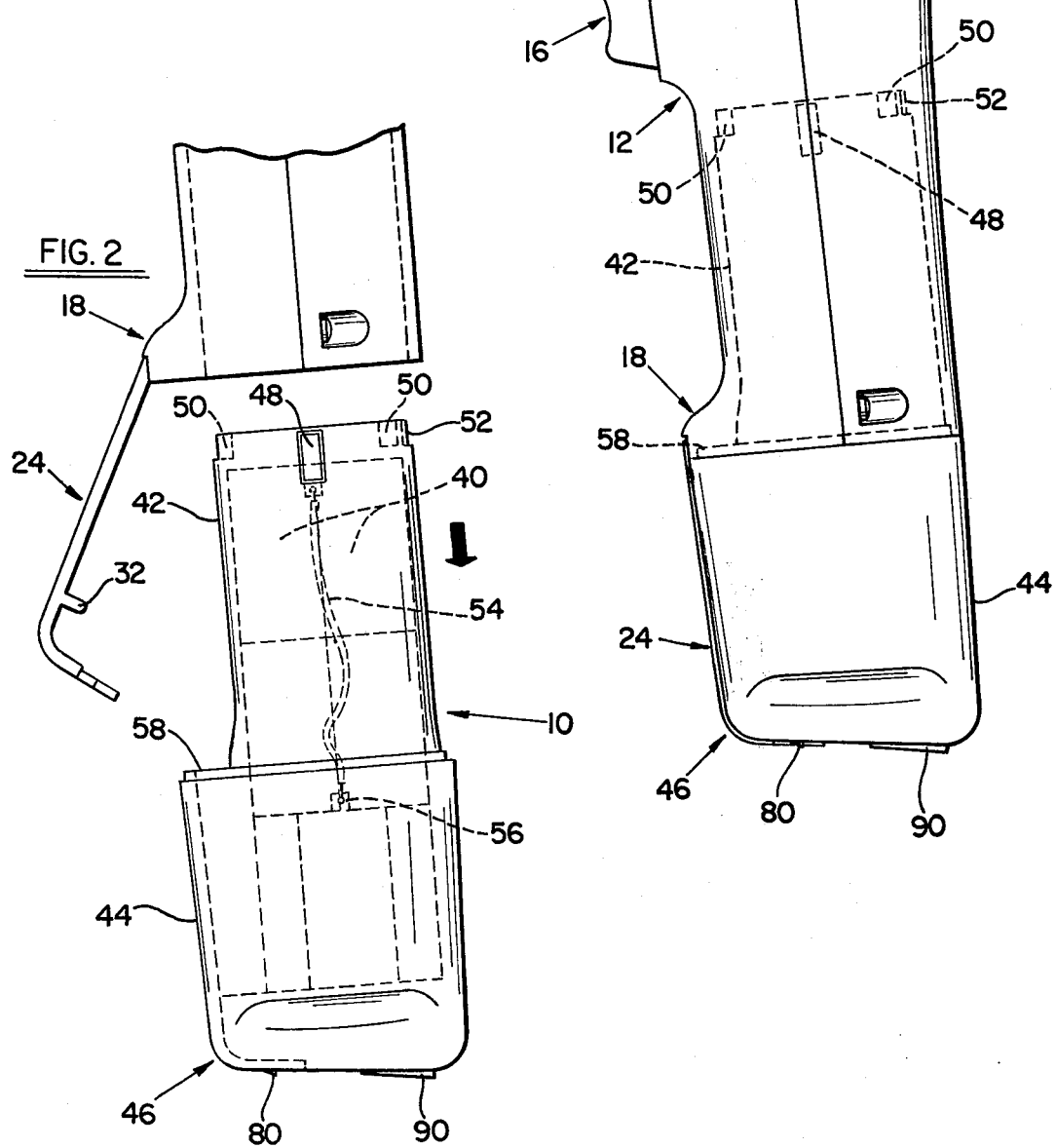

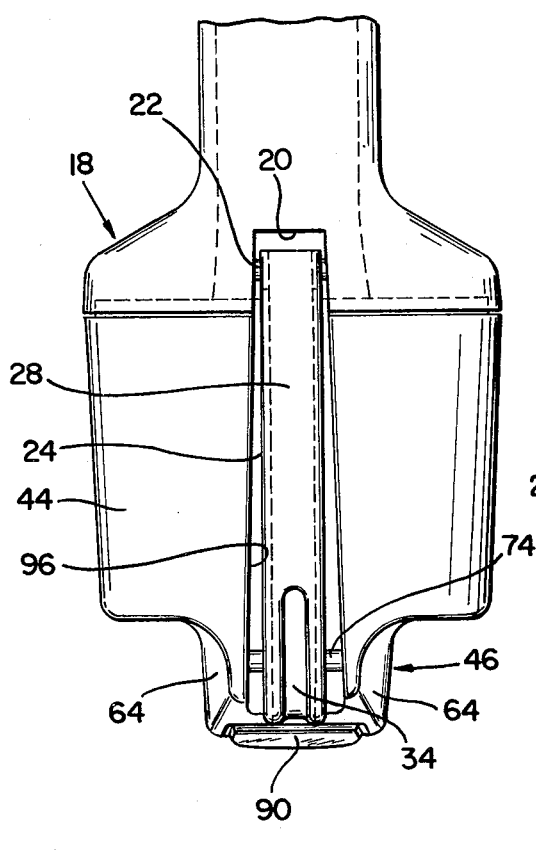
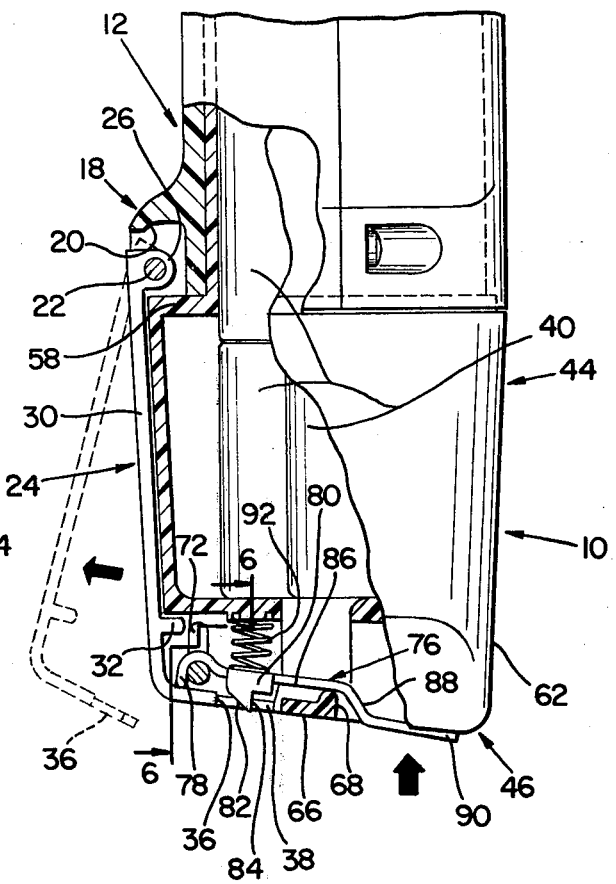
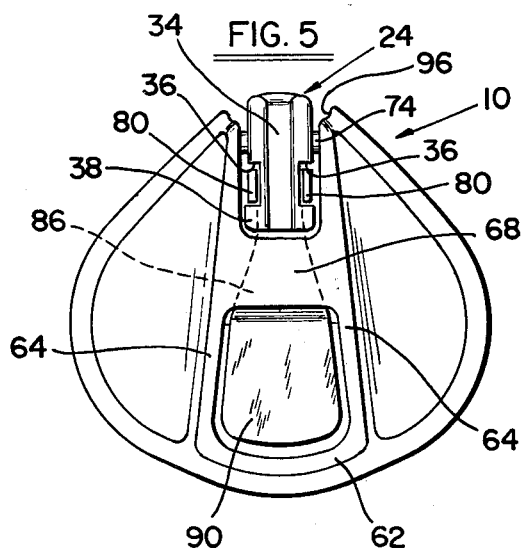
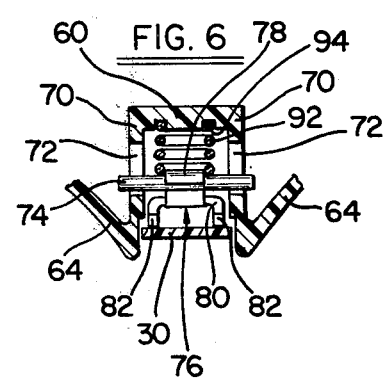

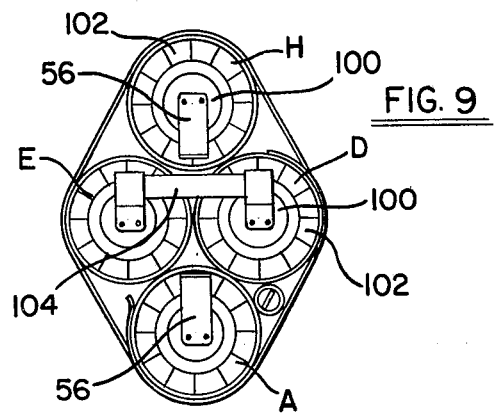
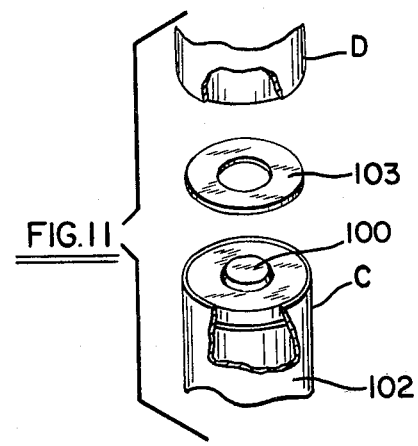
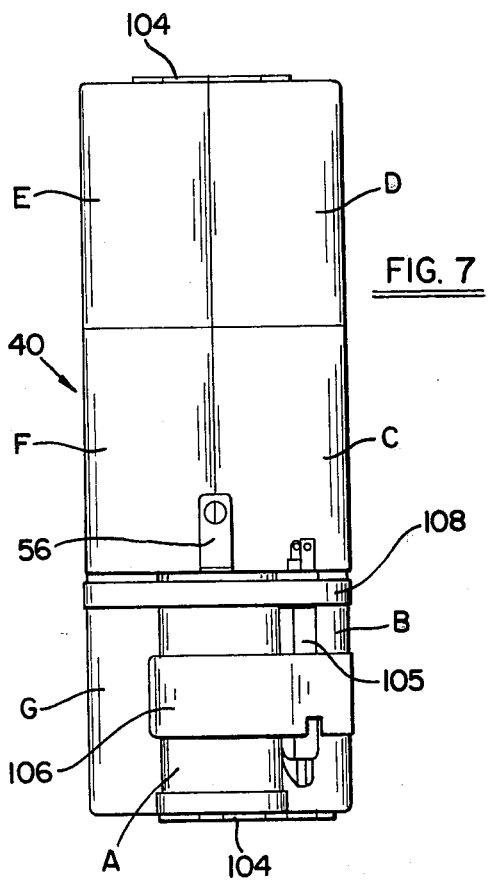
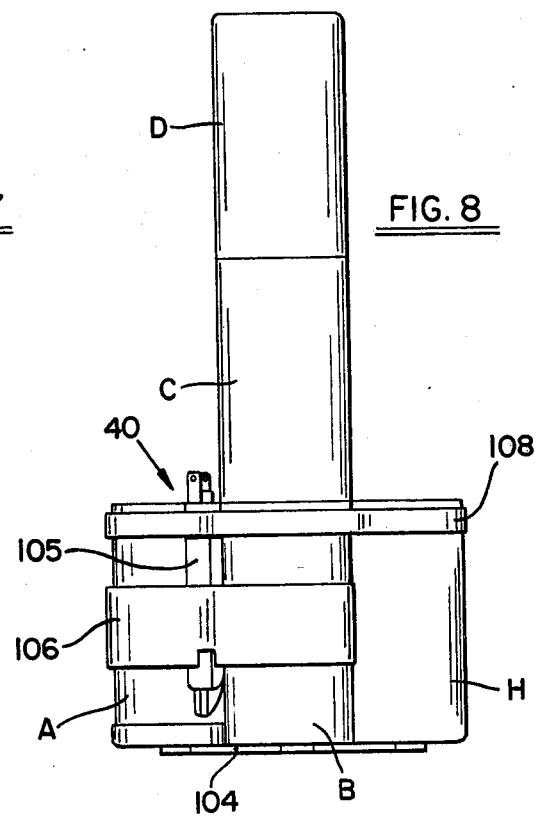
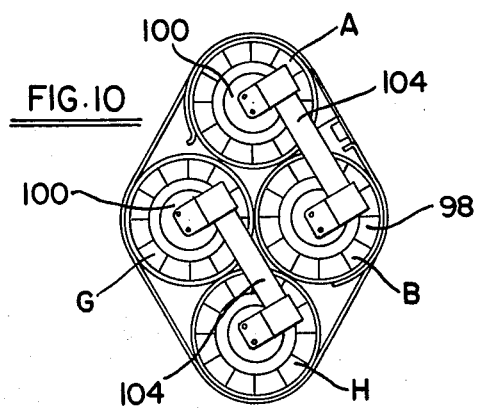
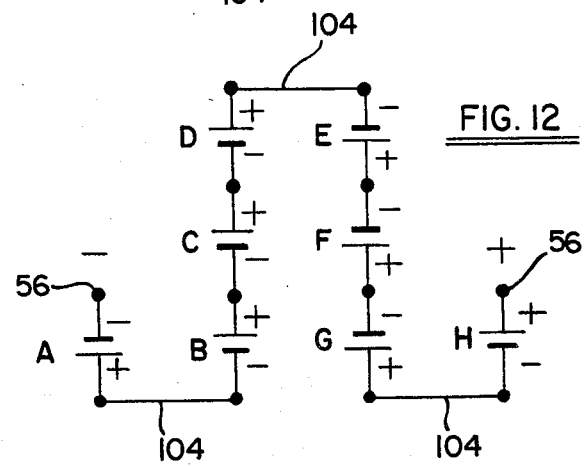

BATTERY PACK AND LATCH

This invention pertains to improved means to removably secure two items together, and to permit their disengagement by a quick release action. More particularly, the invention pertains to a latch and cooperating release member used to secure a slide-out at least partially telescoped battery pack in a power tool. Additionally, the invention also pertains to such a battery pack itself.

The invention provides improved quick release means built partly into each of the two items to be removably secured together. For example, in the preferred embodiment, the invention is built partly into the battery pack itself and partly into the tool or the like in which the battery pack is used. A latch is provided on the tool. The latch is L-shaped, the long leg having a length to overlie the entire exposed portion of the battery pack, and the short leg having an inturned finger or fingers which cooperate with the locking and release mechanism built into the lower or furthestmost remote end of the battery pack. In this manner, the invention latching structure holds the telescoping part of the battery pack up into its cavity in the tool.

The invention battery pack is of the known slide-in type. That is, the battery pack includes a case having a portion adapted to fit into the hollow handle portion or the like of the tool with which it is used. In this manner, the exposed portion of the battery pack is lessened, while at the same time the center of gravity is moved up into the handle by the location of some of the batteries up in the handle or other part which telescopes over the nested part of the battery case. The enlarged, bulbous, exposed part of the pack contains half or more of the total weight of the batteries, and therefore, by being positioned at the free end of the handle, counterbalances the weight of the motor in the tool, thereby enhancing the balance, feel, and ease of use of the combined tool plus battery pack.

The invention provides a spring loaded locking finger on the battery case which cooperates with the swinging latch member on the tool in such a way that the releasing action of the release mechanism springs the latch about its pivot on the case and away from the battery pack, thus greatly facilitating the removal of the battery pack from the tool. Absent this feature of the springing away of the latch from the case, the user would have to manually move the latch. This is the case in many prior art devices, wherein a two step type of operation is required. That is, the user (1) undoes the latch from its lock or other cooperating portion, and then (2) must move the latch, and then (3) finally the user can disassemble the two items which were latched together. The second step is not present in the invention's usage because of the springing away feature.

The invention comprises a free floating locking and release member which is spring loaded about a pivot pin in the remote end of the battery pack to cooperate with the pivoting latch on the tool. The release member pivot pin can move in slots; it "floats", thereby increasing the versatility and flexibility of the invention in operation and assembly. This structure provides for a constant spring load on the battery pack when it is mounted in position, which solves prior problems of securely holding a battery pack in the tool while at the same time permitting a quick release disassembly. The spring also serves to aid the spring-away feature of this pivoting latch by interaction of portions of the release member and the latch. The parts are so configured that this spring, which provides both the preload in the assembled condition and the swinging away during the unlocking action, is located close to the pivot, thereby shortening the stroke of the spring, that is, the amount the spring is compressed, which shortened flexing facilitates operation and lengthens the life of the spring.

The battery pack structure per se, is a compact arrangement of eight cells or batteries of any commercially available variety, preferably rechargeable, mounted in the battery case in such a manner as to facilitate the mounting and dismounting, produce a pleasing appearance, provide an advantageous center of gravity, while at the same time being highly efficient and reliable in use. Further, the battery pack provides advantageous insulation means between the cells, and also provides an arrangement for mounting thermostatic over temperature sensing means within the battery pack to prevent harmful temperature effects on the battery arrangement during re-charging of the pack.

Yet another advantage of the invention latch is that it assures a firm physical and electrical connection between the battery pack contacts and the mating contacts in the tool, whereby the electrical operation of the tool is smooth and trouble free.

The above and other advantages of the invention will be pointed out or will become evident in the following detailed description and claims, and in the accompanying drawings also forming a part of the disclosure in which;

FIG. 1 is a side elevational view of a cordless electric drill utilizing the battery pack and securing means of the invention;

FIG. 2 is a view similar to the handle portion of FIG. 1 showing the method of removal of the battery pack;

FIG. 3 is a front elevational view of the battery pack in latched condition;

FIG. 4 is a side elevational view, partly in section, and showing the swinging latch in phantom lines;

FIG. 5 is a bottom plan view thereof;

FIG. 6 is a partial cross-sectional view taken on line 6—6 of FIG. 4;

FIG. 7 is a side elevational view of the battery arrangement within the battery pack;

FIG. 8 is an end elevational view thereof;

FIG. 9 is a top plan view thereof;

FIG. 10 is a bottom plan view thereof;

FIG. 11 is a perspective view showing the manner in which the cells are joined together with insulation therebetween; and FIG. 12 is a schematic diagram of the electrical connection between the cells and the battery pack.

Referring now in detail to the drawing, FIGS. 1 and 2 show the invention battery pack 10 in use with a drill 12. These two drawings show a typical environment in which the invention can be used, the invention battery pack and latch could also be used in other cordless electric tools, such as lawn and garden trimmers, hedge clippers, other kinds of indoor tools such as a jigsaw, lantern, sprayer, or the like myriad of products which are or could be made in cordless electric form. The drill 12 generally comprises a chuck 14 and a manually operable trigger switch 16, other portions, such as the motor, the interconnections between the battery pack, trigger, and the motor not being shown, in that they are not a material part of the present invention.

The handle portion of the tool 12 is formed with an enlarged boss 18 which extends around three sides of the lower end of the handle to smoothly blend into the battery pack 10 when the battery is positioned therein. A cavity 20 is formed at the forward or inside part of this annular or partially circumferential enlarged boss 18, and a fixed pivot pin 22 for the latch member 24 is fitted across this cavity by any suitable means, not shown. The latch member 24 comprises a pair of wing portions 26 extending inwardly and in parallel to each other from the outer end of the longer leg. The main web 28 is provided with a pair of stiffening ribs 30 which extend the full length of the longer leg. Adjacent the lower end and the turn to the shorter leg of the latch member 24, these ribs 30 are provided with a pair of inwardly extending fingers 32 which are similar to but smaller than the wing portions 26. The structure of web and ribs 28 and 30 adds rigidity to the latch. The lower end of the longer leg, and the entire shorter horizontally disposed leg of the latch member 24, is formed with an elongated center depression 34 extending around the curve between the longer and shorter legs, and serves the purposes of strengthening the latch in this critical region, and aiding in the feature of urging the latch away from the release means to facilitate opening of the latch, as will be set forth below. The ribs 30 are cut away at the outer free end of the shorter leg at the location of a pair of notches 36 therein. The latch terminates at a pair of tabs 38, the ribs having terminated at the inner end of the notches 36.

The battery pack 10 comprises an array of batteries 40 (shown in FIGS. 6 et sic) and described in greater detail below. The batteries 40 are enclosed within a housing formed of plastic or the like material which comprise a slide-in portion 42 and a lower bulbous portion 44. At the bottom of lower portion 44, the battery pack comprises a release portion 46 which is best shown in FIGS. 3 through 5. The upper end of the upper portion 42 is provided with main contacts 48 to interconnect with suitable means, not shown, in the tool 12 to provide power to drive the tool, and to permit charging of the battery pack. Also, at the upper end, there are provided key means, in the form of notches 50 for example, to help locate the battery pack 10 in a charger or the like, not shown. Further, a second contact 52 may also be provided, as needed, for cooperation with fast charging means, or the like as set forth below. A pair of wires 54, inside the battery pack, interconnect the main contacts 48 with terminals 56 (See FIG. 2) on the array of batteries 40. The lower portion 44 is defined by an upper shoulder 58 and by a lower wall 60 shown in FIG. 4. Wall 58 serves as a locator when the tool is fully positioned in the handle of the tool 12 and up against the underside of the handle boss 18.

Wall 60 defines, in part, the top of the battery pack release portion 46. Externally, portion 46 is smoothly molded into and extends below the enlarged bottom portion 44 of the battery pack. Portion 46 is defined by a back wall 62 which is a smooth downward extension of the back wall of the lower portion 44. Additionally, portion 46 is defined by a pair of side walls 64, which, as shown in FIG. 5, together with the back wall 62, define the essentially elongated trapezoidal shape (in plan view) of portion 46. The bottom of portion 46 is essentially open, containing only the cross wall 66 extending between the side walls 64 at about the midpoints thereof to permit assembly of the various parts and facilitate operation of the release mechanism. The rear inside surface of cross wall 66 is provided with an upwardly extending cross bead 68. At the front end, as shown in FIG. 6, the release portion 46 is double walled, and comprises a pair of vertical side walls 70 which extend upwardly from the bottom end of the sloped external side wall 64. These walls 70 extend up to the front part of the bottom wall 60. Bottom wall 60 of the battery case is split, as shown in FIG. 4. The opening is provided for manufacturing purposes. The vertical inner side walls 70 are each provided with a slot 72 in which is fitted suitable pivot means, preferably in the form of a pivot pin 74. A release member 76 is provided in the opening in portion 46, and this member comprises a turned over hook or nose portion 78 which is fitted over the cross pin 74. Nose 78 plays a role in the operation of the invention, as it will be brought out below. Rearwardly of the nose 78, member 76 comprises a pair of parallel disposed downwardly extending latch fingers 80, each comprising a forwardly facing inclined surface 82, and a rearwardly facing locking vertical surface 84. Rearwardly of the fingers 80, member 76 comprises a throat portion 86, a stepped portion 88, and finally terminates at a finger operated end or enlarged tab 90.

Means are provided to resiliently mount release member 76 in release portion 46. To this end, a compression spring 92 bears against the throat portion 86 and has its upper end fitted in an annular well 94 formed in the underside of the forward portion of the bottom wall 60. The compression spring 92 shown is used in the successfully constructed embodiment. However, many other types and varieties of springs and spring means could be used. For example, a leaf spring, a U-shaped spring, or even a molded spring in a plastic part of the "living hinge" variety, could be incorporated to perform the function of the compression spring 92 shown. Therefore, the term "spring means" or the like as used in the specification and claims herein shall be understood to encompass the use of any such spring force producing device.

The bead 68 bears against the underside of the throat portion 86 to locate the release member 76 in the FIG. 4 position. That is, member 76 is normally positioned against pin means 74 at the bottom of its travel in the slots 72, and against the bead 78. In this position, the operating tab 90 extends slightly down below the bottom of the release portion 46 to facilitate its use and access by the operator, as shown. Thus, spring 92 together with the "floating" type mount of pivot pin means 74 in slots 72 comprises the resilient, yielding mounting of member 76, and permits the mode of operation of the invention as set forth herein.

In operation, the slots 72, together with the open structure inside the lower section 44, facilitates the assemblage of the pin means 74, the release member 76, and the spring 92 into portion 46. Further, the slots 72 serve the additional function of taking up any manufacturing tolerance buildups or minor irregularities or the like in the parts, thus assuring a proper assemblage of the various parts while realizing economies and simplifying the work. The spring 92 urges the release member downwardly against the pin 74 and the bead 78, whereby the fingers 80 are located substantially in the bottom plane of the release section 46, in which plane the latch member's shorter leg with its notches 36 and tabs 38 are located, as shown by the dotted line position in FIG. 4. In this position, the rear end of the tabs 38 mate against the flat surfaces 84 of the fingers 80, whereby the release member holds the latch member in the solid line position. In this latched position, the nose 78 bears tightly against the inside of the latch member on the shorter leg in the vicinity of the crotch of the latch member. This pressure between the nose 78 and the latch loads the latch against the spring 92, and may even compress the spring slightly, thus moving the parts upwardly slightly. Thus, when the operator depresses the portion 90, the nose 78 pivots and increases this pressure until the point where the fingers 80 clear the tabs 38, at which time the latch springs out to the dotted line position shown in FIG. 4. This springing action facilitates the user's removing and replacing the entire battery pack 10 in the tool 12. The fingers 32 serve a safety function set forth below.

The structure shown assures that the parts in the portion 46 will all be "snugged up" when the battery pack is not in the tool, that is, the battery pack itself will not have any loose parts even when it is not in position in the tool and not cooperating with the latch 36. The battery pack lower portion is notched out at 96 as shown in FIG. 5 to locate the latch therein, whereby a smooth uninterrupted finish is presented to the user when the pack is in the tool. The sloped surface 82 cooperates with the outermost free end of the short leg of the latch 24, whereby the latch rides up on these surfaces 82, urging the release member up against the spring 92, until the latch arrives at the solid line position of FIG. 4, whereupon the fingers fall in behind the tab 38, to latch the latch in the closed position shown in FIGS. 3, 4 and 5.

The preferred embodiment used a pair of the locking fingers 80 in cooperation with a mating pair of notches 36 formed in the sides of the latch short leg and in spaced relation to its free end. However, in other environments, a single finger and notch as indentation could be used, for example, with the "notch" being a hole in a web rather than side cut-outs as at 36, and with the sole finger punched out or otherwise centered in a cooperating latch or other part. Many other variations could be used embodying the teaching of the invention. For example, a formed recess, rather than a through hole of any sort, could be successfully used. Further, the positions of the finger and of the cooperating hole or indentation could be reversed; that is, the finger or fingers could be on the swinging latch, and the mating opening or indentation or the like could be formed on the release member.

An advantageous feature of the invention structure latch and release mechanism is that the spring 92 is located close to the pivot pin 74, and between the pin 74 and the other fixed stop, the bead 68, whereby the reliability of the functioning is increased, and smooth and sure operation is assured. Further, this spring location, with the spring force in line with the latch, assures that the latch release will be held firmly on the pin and against the stop.

The fingers 32 on the latch 24 serve as a safety. That is, in the latched position shown in FIGS. 3 to 5, these fingers 32 are positioned under the bottom wall 60 and in a predetermined spaced relation thereto. Thus, in the event of a user attempting, most likely unknowingly or unthinkingly, to mis-use the invention by removing the battery pack 10 without undoing the latch 24, these fingers will bear against the wall 60 and prevent such a forcible removal of the battery pack and thereby protect the latch mechanism and the release mechanism.

The invention is not limited to use with a slide-in battery pack in the manner shown. For example, the invention could find utility in many other areas wherein structure equivalent to the latch member 24, rather than structure equivalent to the release portion 46, might be on the removable part. As another alternative, the latch member 24 could be in the form of a door or a hatch or the like to close off an opening. In such case, items to be stored such as batteries or the like could be put in place in the opening closed off by the door or the like having a function corresponding to the long leg of the latch 24. In such case, the release portion 46 might be on a fixed part of the housing. As still another alternative, the latch member 24 could be part of a slide-out battery pack or other item which would fall away, again, the portion 46 being fixed in position. As still another alternative, the portion 46 could be fixed in position, the latch 24 could be in its present form, but fixed to some other item, such as a slide-in battery pack or the like.

Thus, in its most general form, the invention latch and release means can be interposed between any two items to be removably secured to each other. For example, if the short or "hook" end of the latch member were removed, and the release member turned 90° to be in the same plane as the now straight latch member, then the invention could be applied in a host of new environments such as latches for brief cases, luggage, projector cases, camera backs, and the like. By making the parts heavier and stronger, and other minor adjustments the invention latch release mechanism could be applied to doors, such as a light screen door, furniture drawers, kitchen cabinet doors, and the like stationary applications in homes, factories, and so forth. The presence of the latch member safety fingers 32 could also permit the invention latch and release mechanism to be used in pressure vessels, such as a home pressure cooker, or the like, where perhaps a pair of latches and release members would be used on opposite sides of the lid of such a pressure vessel.

Yet another use of the invention would be in armaments whereby a clip of ammunition could be snapped and secured into a gun. For example, the invention could be provided at the butt end of an automatic pistol such as the 45 caliber World War II U.S. Army weapon.

Yet another usage of the invention, closely related to the preferred embodiment shown, would be to incorporate a latch member 24 on the charging device whereby the charger could be secured to a convenient location, such as a ceiling beam in a basement workshop, or the underside of a workbench, or the like. The user would simply snap the battery pack into such a fixed in position charger and latch it in place, whereby it could be charged at the convenience of the user while at the same time being out of his way. Further, by being secured in a fixed position, the battery pack is protected against damage, as by being accidentally knocked off of a workbench or the like and onto the floor. Thus, by latching the battery pack into the charger, a great deal more versatility to the charger is provided, facilitating the user's convenience in performing this operation.

Referring now to FIGS. 7 through 12, the array of the batteries 40 removed from the housing 42 and 44 is shown in greater detail. For ease of description, the batteries have been designated by the capital letters A through H, eight batteries being used in the preferred embodiment of the invention. The batteries are preferably of the modern nickel-chromium rechargeable variety. The array of batteries is a prefabricated subassembly which is mounted into the two portions 42 and 44 of the housing, which portions are later ultrasonically or otherwise joined to each other to form a sealed assembly around the batteries.

Each battery A through H is of the more or less conventional cylindrical external configuration, comprising a bottom end flat electrode or pole 98 and an upper end buttonlike electrode 100. A jacket 102 of cardboard or the like dialectic material is provided around the outside of each battery for insulation purposes. A washer 103 of mylar or the like dialectic material is provided between each two batteries where they are stacked and welded together for the purpose of preventing short circuits between the batteries and assuring a proper circuit of button electrode 100 to a base electrode 98. Six of the batteries, B through G, are arranged in two stacks or columns of three each, and are fitted within the upper slide in portion 42 of the housing. Four of the batteries, including those forming the base of the columns, are arranged in a diamond pattern lying in common horizontal planes. A strap 104, as shown in FIG. 9, is provided across the top of the two three high stacks and is spot welded thereon, as shown. A pair of similar straps 104 are provided across the bottom of the array, in the manner shown in FIG. 10, whereby a series circuit through all the batteries is provided, as indicated in FIG. 12.

The battery pack 40 is advantageously provided with means and the batteries are such as to permit rapid charging thereof. For greater detail in regard to this rapid recharging of the batteries, reference may be had to copending U.S. patent application, Ser. No. 510,391, filed Sept. 30, 1974, by Donald E. Elson and Richard T. Walters entitled "Battery Charging Circuit", and assigned to the same assignee as the present invention. The thermostat 40 of said Elson and Walters patent application corresponds to a thermostat 105 which is held in place in physical, thermal contact with one of the cells by means of a clip 106. The clip is metal, and the jacket 102 of one of the cells is stripped, the cell A being indicated in FIG. 8 for example for this purpose. Thus, the thermostat is in physical contact with this cell in order to sense its temperature and to operate the circuitry, as required, in said copending application. A strip of tape 108 is provided around the lower array of four batteries to help in holding the eight cells A through H in assembled relation, as shown in the drawings. This tape 108, together with the welded straps 104 across the cells, permits this separate subassembly of the batteries prior to their mounting within the housing.

The shape of the battery pack of the invention, which is produced by the configuration of the array of batteries 40, produces advantages when the pack is in a tool, as shown for example in FIG. 1. The batteries, together with the pack and latch means, comprise a substantial weight with respect to the weight of the drill. By positioning a part of the batteries up into the handle, the center of gravity of the tool with the batteries in place is raised. In the embodiment of the invention shown in FIG. 1, the center of gravity is approximately at the rear end of the motor, at a location upwardly and slightly to the right of the trigger 16, looking at FIG. 1. This location of the center of gravity facilitates use and handling of the tool, makes the tool feel comfortable, and reduces fatigue. When the battery pack is removed, the user must exert a considerable amount of strength and force on the back side of the handle to prevent the weight of the motor from tipping or rotating the entire tool forwardly. With the battery pack in place however the weight of the batteries counteracts the weight of the motor, and the moments or twisting forces acting on the tool caused by the weights of the motor and of the batteries substantially cancel each other, whereby the strength required of the user in manipulating the tool is substantially reduced. The tool feels "neutral" in hand, i.e., the user experiences little or no twisting forces.

While the invention has been described in detail above, it is to be understood that this detailed description is by way of example only, and the protection granted is to be limited only within the spirit of the invention and the scope of the following claims.

We claim:

1. Quick release securing means for removably securing first and second items together, comprising a latch member movably mounted on said first item, release means mounted on said second item, said release means comprising a release member pivotally mounted on pivot pin means, spring means in said release means adapted to urge said release member to a normal position, said release member comprising a locking portion, means on said latch member engagable with said locking portion in the latched condition of said latch member on said release means, and a manually operable portion of said release member adapted to move said release member about said pivot pin means to disengage said locking portion from said latch member engaging means.

2. The combination of claim 1, said pivot pin means comprising a pivot pin positioned at one end of said release member, said manual operable portion being positioned at the opposite end of said release member with said locking means interposed therebetween; and said spring means bearing against said release member in the vicinity of said locking means thereon.

3. The combination of claim 1, said release member comprising a portion adapted to urge said latch member out of engagement with said release member locking portion as said release member is moved from the latched condition to the unlatched condition between said release member and said latch member.

4. The combination of claim 3, said pivot pin means comprising a pivot pin, said urging means comprising an upturned flange on said release member partially around said pivot pin adapted to bear against a portion of said latch member to urge said latch member away from said pivot pin and away from said release member as said release member is rotated about said pivot pin.

5. The combination of claim 1, said latch member comprising safety means positioned in closely spaced relation to a portion of said second item in the latched condition of said items, said latch means safety means being positioned in the path of motion of disengagement between said first and second items, whereby said latch means safety means prevents the disengagement of said first and second items from each other so long as said latch means and said release means are engaged.

6. The combination of claim 1, said locking portion comprising at least one locking finger formed on said release member, said latch member comprising an L-shaped member having the outer end of its longer leg pivotally mounted on said first item, and said latch member engaging means comprising at least one notch formed in the outer end of the short leg of said latch member cooperable with said release member locking finger.

7. The combination of claim 1, said second item being formed with a pair of slots disposed parallel to each other and generally parallel to the direction of the manual disengaging motion applied to said manually operable portion of said release member, said pivot pin means comprising a pivot pin, and means to mount said pivot pin in said slots, whereby said spring means urges the pivot pin via said release member mounted thereon towards one end of said slots.

8. The combination of claim 1, said first item comprising a cordless electric device, said second item comprising a slide-in battery pack therefor, said battery pack comprising a portion adapted to be fitted within said device and an exposed portion extending outwardly thereof, said latch member having a length substantially equal to the length of said exposed portion of said battery pack, and said release means being positioned at the remote end of said exposed portion of said battery pack, whereby said latch member overlies and grasps the exposed portion of said battery pack.

9. The combination of claim 1, stop means in said release means cooperable with said release member to define said normal position, and said stop means comprising a bead formed in said release means adapted to engage said release member.

10. The combination of claim 1, said latch member engaging portion comprising a generally flat portion formed with at least one notch in spaced relation to its remote end, said latch member being mounted on said first item in such a way as to permit said engaging portion to approach said release means locking portion in a predetermined direction during the engaging motion therebetween, said release member locking portion comprising at least one locking finger, said locking finger being formed with a tapered surface facing said direction of approach of said latch member moving towards the latched condition, and the opposite side of said locking finger comprising a flat adapted to engage said latch member notch to thereby lock said fingers into said notch to thereby releasably lock said latch member and release means and hence said first and second items together.

11. The combination of claim 10, said latch member comprising a generally flat portion at its remote end and being formed with a pair of said notches in closely spaced relation to said remote end and at the sides of said slot portion, and said release member comprising a pair of said locking fingers cooperable with said notches.

12. The combination of claim 1, said release means being housed in a portion of said second item, said housing portion comprising means to mount said pivot pin means thereon, said spring means comprising a compression spring trapped between a portion of said release member and a portion of said housing, said release member being of stepped configuration, and stop means in said release means comprising a bead molded in said housing and bearing against said stepped portion of said release member under the influence of said compression spring, to define said normal position and said manually operable portion comprising a flat portion adapted to be contacted by an operator's finger, and said flat portion extending out of said housing beyond said second item.

13. In combination, a battery pack for use in a portable, battery operated tool, said battery pack comprising a first group of batteries lying in a common horizontal plane and the remainder of said batteries being arranged in columns extending from at least two of said first group of batteries; a housing for said battery pack, said housing comprising an enlarged bottom portion adapted to encompass said first group of batteries, said housing comprising an upper elongated portion adapted to accommodate said batteries arranged in said columns, means to join said upper and lower casing portions to each other, contact means at the upper end of said upper portion, and means for connecting said batteries in a series circuit between said contacts; a cordless electric device adapted to receive said elongated portion and to cooperate with said contact means, said enlarged bottom portion extending outwardly of said device; and quick release securing means disposed partly on said housing and partly on said device to removably secure said battery pack and said device together, said quick release securing means comprising a latch member movably mounted on said device and release means resiliently mounted on said housing, said release means comprising a release member pivotally mounted on a pivot pin, spring means in said release means adapted to urge said release member to a normal position, said release member comprising a locking portion means on said latch member engageable with said locking portion in the latch condition in said latch member on said release means, and a manually operable portion of said release member adapted to move said release member about said pivot pin to disengage said locking portion from said latch member engaging means.

14. The combination of claim 13, said release member comprising a portion adapted to urge said latch member out of engagement with said release member locking portion as said release member is moved from the latched condition to the unlatched condition.

15. The combination of claim 13, said latch member comprising safety means positioned in closely spaced relation to a portion of said housing in the latched condition of said housing in said device, and said latch means safety means being positioned in the path of motion of disengagement between said housing out of said device.

16. The combination of claim 13, said latch member engaging portion comprising a generally flat portion formed with a pair of notches in closely spaced relation to its remote end, said latch member being mounted on said device in such a way as to permit said engaging portion to approach said release means locking portion in a predetermined direction during the engaging portion therebetween, said release member locking portion comprising a pair of locking fingers, said locking fingers being formed with a pair of tapered surfaces facing said direction of approach of said latch member moving towards the latched condition, and the opposite sides of said locking fingers comprising flats adapted to engage said latch member notches to thereby lock said fingers into said notches to thereby releasably lock said housing and said device together.

17. Means for securing a separable case adapted to be at least partially telescoped within a housing to said housing, said securing means comprising a latch member pivotally mounted on one of said housing and said separable case and a release member movably mounted on the other of said housing and said separable case, said latch member having a portion coextensive with the portion of said case which is not telescoped within said housing, said securing means comprising at least one notch engageable with at least one locking finger and a manually operable portion adapted to effect disengagement between said locking finger and said notch, said manually operable-portion being connected to one of said locking finger and said notch for movement thereof out of engagement with the other, said other of said locking finger and said notch being connected to said latch member for movement away from the latched position of said one of said locking finger and said notch upon movement of said manually operable portion, said notches being formed in said latch member and said latch member being mounted on said housing, said case comprising a slide-in battery pack, said housing comprising a portion of a cordless electric device, means to resiliently mount said release member on said battery pack, and said locking finger being formed on said release member.

18. Means for securing a separable case adapted to be at least partially telescoped within a housing to said housing, said securing means comprising a latch member pivotally mounted on one of said housing and said separable case and a release member movably mounted on the other of said housing and said separable case, said latch member having a portion coextensive with the portion of said case which is not telescoped within said housing, said securing means comprising at least one notch engageable with at least one locking finger and a manually operable portion adapted to effect disengagement between said locking finger and said notch, said manually operable-portion being connected to one of said locking finger and said notch for movement thereof out of engagement with the other, said other of said locking finger and said notch being connected to said latch member for movement away from the latched position of said one of said locking finger and said notch upon movement of said manually operable portion, said release member being of generally elongated shape; a pivot pin in said case positioned at one end of said release member, said manual operable portion being positioned at the opposite end of said release member, and said locking finger being formed on said release member and interposed therebetween; and operable portion spring means bearing against said release member in the vicinity of said locking finger.

19. Means for securing a separable case adapted to be at least partially telescoped within a housing to said housing, said securing means comprising a latch member pivotally mounted on one of said housing and said separable case and a release member movably mounted on the other of said housing and said separable case, said latch member having a portion coextensive with the portion of said case which is not telescoped within said housing, said securing means comprising at least one notch engageable with at least one locking finger and a manually operable portion adapted to effect disengagement between said locking finger and said notch, said manually operable-portion being connected to one of said locking finger and said notch for movement thereof out of engagement with the other, said other of said locking finger and said notch being connected to said latch member for movement away from the latched position of said one of said locking finger and said notch upon movement of said manually operable portion, said case being formed with a pair of slots disposed parallel to each other and generally parallel to the direction of the manual disengaging motion applied to said manual operable portion, a pivot pin mounted in said slots, and said release member being mounted on said pivot pin, and a spring adapted to urge said pivot pin via said release member mounted thereon towards one end of said slots.

20. Quick release securing means comprising at least one locking finger cooperable with a latch, at least one latch formed in said latch in spaced relation to its remote end, means to resiliently mount said locking finger, means to pivotally mount said latch at the end thereof opposite said notched remote end in such a way as to permit said latch to approach said locking finger in a predetermined direction, said finger being formed with a tapered surface facing the direction of approach of said latch towards the secured condition of said latch and said locking finger, the opposite side of said locking finger comprising a flat adapted to engage said notch after said latch has urged said finger out of said approach path and to thereafter lock said finger into said notch when said finger is urged back towards said notch by said resilient mounting means.

21. The combination of claim 20, wherein said latch is formed with a pair of said notches, and said at least one locking finger comprising a pair of said fingers for cooperation with said notches.

22. The combination of claim 20, and means to urge said latch away from said locking fingers as said locking fingers and said notches are moved out of engagement with each other.

23. The combination of claim 20, first and second items each mounting one of said latch and locking finger respectively, said latch comprising safety means positioned in closely spaced relation to a portion of said second item in the latched together condition of said items, said safety means being positioned in the path of motion of disengagement between said first and second items, whereby said safety means prevents the disengagement of said first and second items from each other so long as said notches and said finger are engaged.

24. The combination of claim 23, said first item comprising a cordless electric device, said second item comprising a slide-in battery pack therefor, said battery pack comprising a portion adapted to be fitted within said device and an exposed portion extending outwardly thereof, said latch being mounted on said device and having a length substantially equal to the length of said exposed portion of said battery pack, and said finger comprising a portion of release means positioned at the remote end of said exposed portion of said battery pack.

25. The combination of claim 20, said resilient mounting means comprising a pair of slots disposed parallel to each other and generally parallel to the direction of motion applied to disengage said finger and said notch, said resilient mounting means comprising a pivot pin mounted in said slots, a member carrying one of said finger and said notch mounted on said pivot pin, and spring means bearing against said member to urge said pivot pin via said member mounted thereon towards one end of said slots.

26. A cordless electric tool having a motor and a slide-in battery pack therefor, a trigger actuated switch interposed between said motor and said battery pack, a portion of said battery pack being positioned within the housing of said tool and a portion of said battery pack being positioned outside the housing of said tool, securing means located at least partially on said outside portion of said battery pack for removably securing said battery pack to said tool, said securing means comprising a latch pivotally mounted on said tool and manually operable locking and release means on said outside portion of said battery pack cooperable with said latch, and said latch extending coextensively with at least a substantial portion of said outside portion of said battery pack.

27. The combination of claim 26, said release means comprising a release member of generally elongated shape; a pivot pin positioned at one end of said release member, a manual operable portion at the opposite end of said release member, and locking means interposed therebetween; and spring means bearing against said release member in the vicinity of said locking means thereon.

28. The combination of claim 27, said release member comprising a portion adapted to urge said latch out of engagement with said release member locking portion as said release member is moved from the latched condition to the unlatched condition.

29. The combination of claim 28, said urging means comprising an upturned flange on said release member partially around said pivot pin adapted to bear against a portion of said latch to urge said latch away from said pivot pin and away from said release member as said release member is rotated about said pivot pin.

30. The combination of claim 26, said latch comprising safety means positioned in closely spaced relation to a portion of said battery pack in the latched condition, said safety means being positioned in the path of the removal motion of said pack out of said tool, whereby said safety means prevents removal of said pack out of said tool so long as said latch and said release means are engaged.

31. The combination of claim 26, said release means comprising a pair of locking fingers, said latch comprising a generally flat end portion formed with a pair of notches in the sides thereof and in spaced relation to said remote end, said latch being mounted on said tool in such a way as to permit said notched end to approach said locking fingers in a predetermined direction during the engaging motion therebetween, said locking fingers being formed with a pair of tapered surfaces facing said direction of approach of said latch towards the latched condition, and the opposite sides of said locking fingers comprising flats adapted to engage said notches to thereby lock said fingers into said notches to thereby releasably lock said latch and release means and said tool and pack together.

32. The combination of claim 26, said release means being housed in the end of the outside portion of said pack, said release means comprising a release member mounted on a pivot pin, a compression spring trapped between a portion of said release member and a portion of said pack, said release member being of stepped configuration, and stop means in said release means comprising a bead molded in said housing and bearing against said stepped portion of said release member under the influence of said compression spring, and said release member comprising a manually operable portion comprising a flat adapted to be contacted by an operator's finger, and said flat extending out beyond said end of said outside portion of said pack.

33. The combination of claim 32, said pack being formed with a pair of slots disposed parallel to each other and generally parallel to the direction of the manual disengaging motion applied to said flat, and means to mount said pivot pin in said slots, whereby said spring urges the pivot pin via said release member mounted thereon towards one end of said slots.

* * * * *